United States Patent
Whebe Spiridon

(10) Patent No.: US 11,677,286 B2
(45) Date of Patent: Jun. 13, 2023

(54) SALIENT POLE MACHINE WITH ROTOR HAVING ROTOR RIM WITH POLE-RIM INTERFACE AND FIXATION POINTS

(71) Applicant: GE Renewable Technologies, Grenoble (FR)

(72) Inventor: Michel Whebe Spiridon, Birr (CH)

(73) Assignee: GE Renewable Technologies, Grenoble (FR)

(*) Notice: Subject to any disclaimer, the term of this patent is extended or adjusted under 35 U.S.C. 154(b) by 0 days.

(21) Appl. No.: 17/952,706

(22) Filed: Sep. 26, 2022

(65) Prior Publication Data
US 2023/0009096 A1 Jan. 12, 2023

Related U.S. Application Data

(63) Continuation of application No. 16/490,153, filed as application No. PCT/IB2017/000345 on Mar. 3, 2017, now Pat. No. 11,476,729.

(51) Int. Cl.
*H02K 1/32* (2006.01)
*H02K 1/24* (2006.01)
*H02K 1/28* (2006.01)
*H02K 1/26* (2006.01)

(52) U.S. Cl.
CPC ............ *H02K 1/325* (2013.01); *H02K 1/243* (2013.01); *H02K 1/28* (2013.01); *H02K 1/265* (2013.01)

(58) Field of Classification Search
CPC .... H02K 15/02; H02K 15/024; H02K 15/026; H02K 15/028; H02K 15/03;

(Continued)

(56) References Cited

U.S. PATENT DOCUMENTS 918,498 A * 4/1909 Behrend .................. H02K 3/51
310/194
918,499 A * 4/1909 Behrend .................. H02K 3/51
310/262

(Continued)

FOREIGN PATENT DOCUMENTS

DE 1488665 A1 * 9/1969 ............... H02K 3/16
DE 3604584 A1 9/1986

(Continued)

OTHER PUBLICATIONS

De 1488665A1 English Translation.*
EP Search Report Corresponding to EP17152426 dated Jun. 21, 2017.

*Primary Examiner* — Maged M Almawri
(74) *Attorney, Agent, or Firm* — Dority & Manning, P.A.

(57) ABSTRACT

A salient pole machine a rotor having a rotor rim. A plurality of salient poles having a pole winding and extending in the radial direction are attached to the rotor rim, with the rotor rim having an outermost radial surface between the pole-rim interfaces. A plurality of axial rib-like rim extensions project radially from the outermost radial surface of the rotor rim with a predetermined circumferential distance between neighboring rim extensions. A plurality of axial pole grooves in the salient pole match and receive the rim extensions. Fixing elements fix the rim extensions in the pole grooves and are inserted axially into facing interface holes defined in facing sidewalls of the pole grooves and the rib-like rim extensions. The fixing elements are radially inward of the pole windings and are accessible for axial sliding removal from the facing interface holes.

11 Claims, 2 Drawing Sheets

(58) Field of Classification Search
CPC ...... H02K 15/0006; H02K 1/28; H02K 7/183;
H02K 2213/12; H02K 7/1838; H02K
1/24; H02K 1/02; H02K 1/32; H02K
1/265; H02K 1/26; H02K 1/325; H02K
1/243; H02K 3/18; H02K 3/52; H02K
3/527; H02K 3/34; H02K 3/345; H02K
19/02; H02K 19/16; H02K 19/38
USPC ......... 310/61, 261.1–266, 216.001, 216.074,
310/216.091, 216, 59, 52, 54, 57, 58,
310/262, 433, 216.132, 216.086, 216.079,
310/216.013, 216.004, 269
See application file for complete search history.

(56) References Cited

U.S. PATENT DOCUMENTS

| | | | | | |
|---|---|---|---|---|---|
| 1,608,256 | A * | 11/1926 | Suter | | H02K 1/32 |
| | | | | | 310/64 |
| 2,386,673 | A * | 10/1945 | Fisher | | H02K 3/493 |
| | | | | | 310/214 |
| 2,720,605 | A * | 10/1955 | Herd | | H02K 3/527 |
| | | | | | 310/194 |
| 2,736,829 | A * | 2/1956 | Sills | | H02K 1/08 |
| | | | | | 310/216.098 |
| 2,812,460 | A * | 11/1957 | Meyer | | H02K 1/28 |
| | | | | | 310/269 |
| 2,852,711 | A * | 9/1958 | Derner | | H02K 1/28 |
| | | | | | 310/269 |
| 2,872,605 | A * | 2/1959 | Moore | | H02K 3/527 |
| | | | | | 310/194 |
| 3,221,194 | A * | 11/1965 | Blackburn | | H02K 1/276 |
| | | | | | 310/103 |
| 3,229,136 | A * | 1/1966 | Pannell | | H02K 1/243 |
| | | | | | 310/265 |
| 3,235,758 | A * | 2/1966 | Dinsmore | | H02K 7/106 |
| | | | | | 310/98 |
| 3,339,097 | A * | 8/1967 | Dunn | | H02K 3/522 |
| | | | | | 310/194 |
| 3,766,417 | A * | 10/1973 | Hallenbeck | | H02K 3/527 |
| | | | | | 310/214 |
| 3,777,190 | A * | 12/1973 | Guimbal | | H02K 3/00 |
| | | | | | 310/192 |
| 3,849,683 | A * | 11/1974 | Leistner | | H02K 1/30 |
| | | | | | 310/216.104 |
| 3,898,491 | A | 8/1975 | Long et al. | | |
| 4,028,574 | A * | 6/1977 | Canay | | H02K 3/20 |
| | | | | | 310/183 |
| 4,489,249 | A * | 12/1984 | Olivier | | H02K 1/24 |
| | | | | | 310/216.011 |
| 4,644,201 | A * | 2/1987 | Tani | | H02K 7/04 |
| | | | | | 310/216.004 |
| 4,689,973 | A * | 9/1987 | Hershberger | | D06F 37/304 |
| | | | | | 68/23.7 |
| 4,700,096 | A * | 10/1987 | Epars | | H02K 1/2773 |
| | | | | | 310/156.61 |
| 4,862,024 | A * | 8/1989 | Stingle | | H02K 9/22 |
| | | | | | 165/47 |
| 5,189,325 | A * | 2/1993 | Jarczynski | | H02K 9/197 |
| | | | | | 310/61 |
| 5,619,871 | A * | 4/1997 | Forbes | | H02K 29/06 |
| | | | | | 68/23.7 |
| 5,666,016 | A * | 9/1997 | Cooper | | H02K 3/24 |
| | | | | | 310/59 |
| 5,773,910 | A * | 6/1998 | Lange | | H02K 21/125 |
| | | | | | 310/90 |
| 5,780,951 | A * | 7/1998 | Stephens | | H02K 1/148 |
| | | | | | 310/40 MM |
| 5,932,948 | A * | 8/1999 | Morrison | | H02K 3/527 |
| | | | | | 310/214 |
| 5,952,755 | A * | 9/1999 | Lubas | | H02K 1/2773 |
| | | | | | 310/156.19 |
| 6,054,790 | A * | 4/2000 | Kjeer | | H02K 3/527 |
| | | | | | 310/216.086 |
| 6,323,572 | B1 * | 11/2001 | Kinoshita | | H02K 1/2766 |
| | | | | | 310/156.55 |
| 6,452,301 | B1 * | 9/2002 | Van Dine | | H02K 1/2773 |
| | | | | | 310/156.12 |
| 6,492,754 | B1 * | 12/2002 | Weiglhofer | | H02K 1/2773 |
| | | | | | 310/156.08 |
| 6,561,336 | B1 * | 5/2003 | Huart | | F02B 63/04 |
| | | | | | 192/85.49 |
| 6,614,142 | B1 * | 9/2003 | Bonnieman | | H02K 1/24 |
| | | | | | 310/264 |
| 6,727,634 | B2 * | 4/2004 | Tornquist | | H02K 3/527 |
| | | | | | 310/270 |
| 6,794,792 | B2 * | 9/2004 | Wang | | H02K 55/04 |
| | | | | | 310/179 |
| 6,849,987 | B2 * | 2/2005 | Tornquist | | H02K 3/527 |
| | | | | | 310/260 |
| 6,952,070 | B1 * | 10/2005 | Kaminski | | H02K 3/51 |
| | | | | | 310/64 |
| 7,015,617 | B2 * | 3/2006 | Tornquist | | H02K 3/527 |
| | | | | | 310/214 |
| 7,262,526 | B2 * | 8/2007 | Shiga | | H02K 15/03 |
| | | | | | 310/156.28 |
| 7,466,054 | B2 * | 12/2008 | Watson | | H02K 1/2773 |
| | | | | | 310/156.08 |
| 7,492,073 | B2 * | 2/2009 | Qu | | H02K 19/24 |
| | | | | | 310/268 |
| 7,687,928 | B2 * | 3/2010 | Taneja | | F02N 11/04 |
| | | | | | 290/31 |
| 7,698,803 | B2 * | 4/2010 | Mitsui | | H02K 15/022 |
| | | | | | 29/605 |
| 7,839,049 | B2 * | 11/2010 | Jansen | | H02K 1/14 |
| | | | | | 310/194 |
| 8,004,140 | B2 * | 8/2011 | Alexander | | H02K 1/2773 |
| | | | | | 310/216.057 |
| 8,138,650 | B2 * | 3/2012 | Shiga | | H02K 1/2786 |
| | | | | | 29/598 |
| 8,148,834 | B2 * | 4/2012 | Huang | | F02N 11/04 |
| | | | | | 290/40 C |
| 8,232,702 | B2 * | 7/2012 | Zywot | | H02K 1/325 |
| | | | | | 310/214 |
| 8,786,158 | B2 * | 7/2014 | Neuenschwander | | H02K 15/022 |
| | | | | | 310/216.043 |
| 9,041,232 | B2 * | 5/2015 | Shah | | H02K 19/24 |
| | | | | | 290/31 |
| 10,491,067 | B2 * | 11/2019 | Fraser | | H02K 1/2786 |
| 11,476,729 | B2 * | 10/2022 | Whebe Spiridon | | H02K 1/243 |
| 2003/0030333 | A1 * | 2/2003 | Johnsen | | H02K 1/32 |
| | | | | | 310/54 |
| 2003/0098628 | A1 | 5/2003 | Enomoto et al. | | |
| 2004/0140727 | A1 * | 7/2004 | Tornquist | | H02K 3/527 |
| | | | | | 310/260 |
| 2005/0253476 | A1 * | 11/2005 | Zhong | | H02K 1/08 |
| | | | | | 310/216.064 |
| 2006/0103253 | A1 * | 5/2006 | Shiga | | H02K 1/2786 |
| | | | | | 310/43 |
| 2007/0063612 | A1 * | 3/2007 | Oh | | H02K 3/38 |
| | | | | | 29/598 |
| 2008/0001495 | A1 * | 1/2008 | Qu | | H02K 55/02 |
| | | | | | 310/179 |
| 2009/0096314 | A1 * | 4/2009 | Atarashi | | H02K 16/02 |
| | | | | | 310/156.53 |
| 2010/0141067 | A1 * | 6/2010 | Kitagawa | | H02K 3/522 |
| | | | | | 310/71 |
| 2010/0213885 | A1 * | 8/2010 | Ichiyama | | H02K 21/12 |
| | | | | | 310/156.46 |
| 2010/0231085 | A1 * | 9/2010 | Ifrim | | H02K 1/2773 |
| | | | | | 310/216.123 |
| 2010/0295301 | A1 * | 11/2010 | Huang | | F02N 11/04 |
| | | | | | 290/31 |
| 2010/0295411 | A1 * | 11/2010 | Hatch | | H02K 1/24 |
| | | | | | 29/598 |
| 2011/0095643 | A1 * | 4/2011 | Laloy | | H02K 1/24 |
| | | | | | 310/216.132 |

(56) References Cited

U.S. PATENT DOCUMENTS

| | | | | |
|---|---|---|---|---|
| 2011/0285238 A1* | 11/2011 | Kusase | ........... | H02K 16/04 310/156.48 |
| 2011/0291518 A1* | 12/2011 | McCabe | ........... | H02K 3/527 310/214 |
| 2012/0025639 A1* | 2/2012 | Zywot | ........... | H02K 19/38 310/214 |
| 2012/0126643 A1* | 5/2012 | Zhong | ........... | H02K 1/325 310/59 |
| 2012/0181793 A1* | 7/2012 | Hein | ........... | H02K 21/44 290/55 |
| 2012/0200187 A1* | 8/2012 | Sano | ........... | H02K 1/2766 310/156.07 |
| 2012/0228965 A1* | 9/2012 | Bang | ........... | H02K 21/12 310/156.02 |
| 2013/0026871 A1* | 1/2013 | Van Dam | ........... | H02K 1/2766 310/156.08 |
| 2013/0088111 A1* | 4/2013 | Park | ........... | H02K 1/2773 310/216.135 |
| 2013/0093276 A1* | 4/2013 | Kim | ........... | H02K 16/00 310/114 |
| 2013/0187507 A1* | 7/2013 | Fouquart | ........... | H02K 1/28 310/156.15 |
| 2013/0207524 A1* | 8/2013 | Baba | ........... | A61F 2/588 310/348 |
| 2013/0270955 A1* | 10/2013 | Lillington | ........... | H02K 1/2773 29/598 |
| 2013/0307363 A1* | 11/2013 | Sano | ........... | H02K 1/27 310/156.01 |
| 2014/0265660 A1* | 9/2014 | Kulkarni | ........... | H02K 3/24 310/54 |
| 2014/0292119 A1* | 10/2014 | Takahashi | ........... | H02K 3/12 310/214 |
| 2014/0300240 A1* | 10/2014 | Hochstetler | ........... | H02K 3/487 310/214 |
| 2014/0339952 A1* | 11/2014 | Jung | ........... | H02K 1/28 310/216.001 |
| 2016/0226326 A1* | 8/2016 | Gotschmann | ........... | H02K 1/2766 |
| 2018/0287443 A1* | 10/2018 | Umeda | ........... | H02K 1/28 |
| 2021/0050761 A1* | 2/2021 | Loos | ........... | H02K 1/24 |

FOREIGN PATENT DOCUMENTS

| | | |
|---|---|---|
| EP | 0090324 A1 | 10/1983 |
| EP | 0740402 A1 | 10/1996 |
| GB | 2173648 B | 10/1988 |
| JP | S60249837 A | 12/1985 |

\* cited by examiner

SALIENT POLE MACHINE WITH ROTOR HAVING ROTOR RIM WITH POLE-RIM INTERFACE AND FIXATION POINTS

RELATED APPLICATIONS

The present application is a Continuation Application of U.S. application Ser. No. 16/490,153 filed Aug. 30, 2019, which was a § 371 National Phase Application of International Application No. PCT/IB2017/000345 filed Mar. 3, 2017, both of which are incorporated by reference herein for all purposes.

BACKGROUND OF THE INVENTION

The present invention relates to rotating machines. It refers to a salient pole machine according to the preamble of claim 1.

PRIOR ART

Vertical-axis hydroelectric machines are well known in the art.

Document EP 0 740 402 A1 relates to a vertical-axis hydroelectric machine having a rotor star, which is provided with a hub and on the outer periphery of which a rotor rim is arranged which carries rotor poles, laminated from pole plates, and pole coils, and a stator which surrounds the rotor, is separated from the latter by an air gap and has a stator plate body laminated from plates and having slots at the inner periphery for accommodating a stator winding, which has stator winding ends and winding connections at both end faces of the plate body, both rotor rim and stator plate body having radially running cooling slits through which cooling air can be passed from the hub through said slits in the rotor rim, the distances between the poles, the air gap and the slits in the stator plate body into an annular space surrounding the latter and equipped with coolers and from there back to the hub, the rotor itself acting as delivery and pressure-generating means for the cooling air.

As shown in FIG. 1, which is a part of FIG. 2 of the EP 0 740 402 A1, the rotor construction of the prior art comprises a rotor hub (not shown), from which slanting spokes radiate, which are covered at the top and bottom by a cover ring. These components form a rotor star. A rotor rim 10 is arranged at its outer periphery. It consists of plate segments 11 which are stacked in layers one on top of the other in a staggered manner in the peripheral direction. In this arrangement, adjacent plate segments 11 of a layer are distanced from one another so that a multiplicity of radially running cooling slits 12 are obtained which pass completely through the rotor rim and through which cooling air can flow radially to the outside in the arrow direction. The mechanical connection between the slanting arms and the rotor rim 10 is made in a known manner by strips 13, wedges 14 and axial slots 15 at the inner periphery of rotor rim 10. At the outer periphery, rotor rim 10 has axially running dovetailed slots for fastening rotor poles 17 provided with correspondingly formed dovetailed pole claws 16. The rotor poles 17 carry a pole winding 18. The radial cooling slits 12 in the rotor rim 10 in each case open out in the space between two adjacent rotor poles 17, the so-called pole gap 19.

The design used in this machine has a main disadvantage: The pole claw slots in the rotor rim, which receive the pole claws of the salient poles, weaken the rim and create a dead weight mass, which has to be sustained by the remaining section of the rim, discounted the poles slots and stud holes (in case of laminated rim).

Eliminate the pole claw slot in the rim, this makes the rim weaker, as well as, create a dead weight mass which has to be sustained by the remaining section of the rim, discounted the poles slots and stud holes (in case of laminated rim).

SUMMARY OF THE INVENTION

It is an object of the present invention to provide a salient pole machine, which avoids the disadvantages of known machines and especially strengthens the rotor at its rim.

This object is obtained by a salient pole machine according to claim 1.

The salient pole machine according to the invention comprises a rotor rotating about a machine axis, said rotor having at its circumference a rotor rim with a predetermined outer radius, whereby a plurality of salient poles, each extending in radial direction, are attached to said rotor at said rotor rim at a respective pole-rim interface.

It is characterized in that at said pole-rim interface a plurality of axial rib-like rim extensions project radially from said rotor rim with a predetermined circumferential distance between neighboring rim extensions, that each salient pole has a plurality of axial pole grooves matching and receiving said rib-like rim extensions at the respective pole-rim interface, and that fixing elements) are provided to fix said rib-like rim extensions in said pole grooves.

According to an embodiment of the invention said fixing elements are arranged outside said rotor rim.

Especially, said fixing elements may extend and be applied in axial direction.

Furthermore, said fixing elements may be arranged in respective interface holes between said pole grooves and said rib-like rim extensions at the sidewalls thereof.

Especially, said fixing elements may be axial fixation pins.

Said fixation pins may be shear pins having a circular cross section.

Said fixation pins may be configured as expansion pins, which eliminate the radial clearance of their interface holes.

Said fixation pins may be configured as split pins.

Especially, said fixation pins may be split in two and have a crocodile tapered shape interface.

The number of fixation pins and their positions is consequence of mechanical dimensioning, which means that the pins are not necessarily equally distributed along the interface surface of the poles to the rim.

The same applies to the size of the pins, which does not need to be the same on each interface point.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

In the prior art poles on salient pole machines are either fixed to the rotor rim using pole body extensions named "Pole Claws", which are elements projecting from the pole body inwards the machine, fitting on rotor rim slots, or they are fixed through bolts, going radially through the rotor rim and part of the pole.

According to the present invention the pole to rim connection (pole-rim interface) is optimized through a minimum height connection system, placed on pole side area, using shear pins in between.

According to this idea, there are no pole claws extending inwards or fixing bolts. The rotor rim projects itself outwards, into the pole body and fixation is done with shear pins in between. Since pole fitting can be done radially, such solution can also help to minimize clearance between pole and rim, which helps strongly to minimize the reluctance through the magnetic path.

Instead of the classical prior art solution, using slots cut radially located inside the outer radius of the rotor rim, as well as, pole claws projecting radially inwards to fix the pole core on the rotor rim, the present anchoring solution is developed basically in the pole core region, projecting the pole fixation outwards from the outer radius of the rim (and consequently inwards into the pole core).

Part of the anchoring system or pole-rim interface is placed below or under the shadow of the pole coil. Thus, to remove the pole, after removing the connecting pins, it is necessary to slide the pole slightly radially, using the air gap space and then slide it axially, parallel to the rim axial length.

Figure 1:
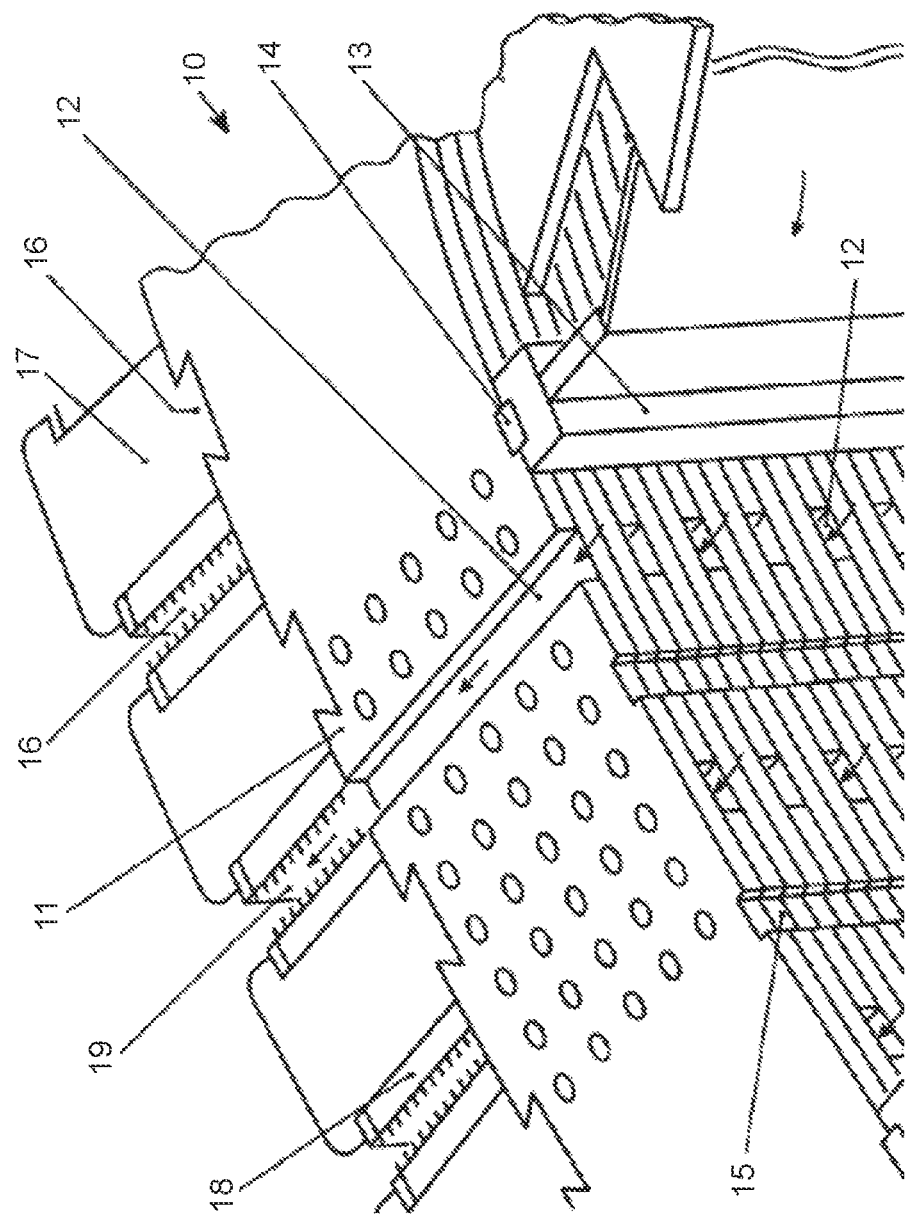
FIG. 1 shows a detailed perspective view of a salient pole machine rotor with salient poles attached by means of pole claws according to prior art.
Figure 2:
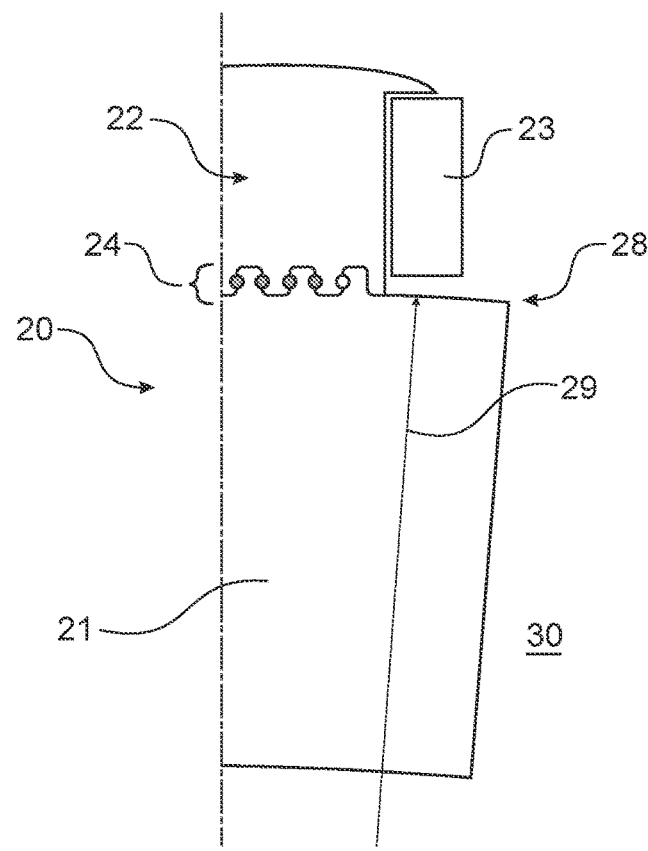
FIG. 2 shows in a sectional axial view a pole attachment according to an embodiment of the invention.
Figure 3:
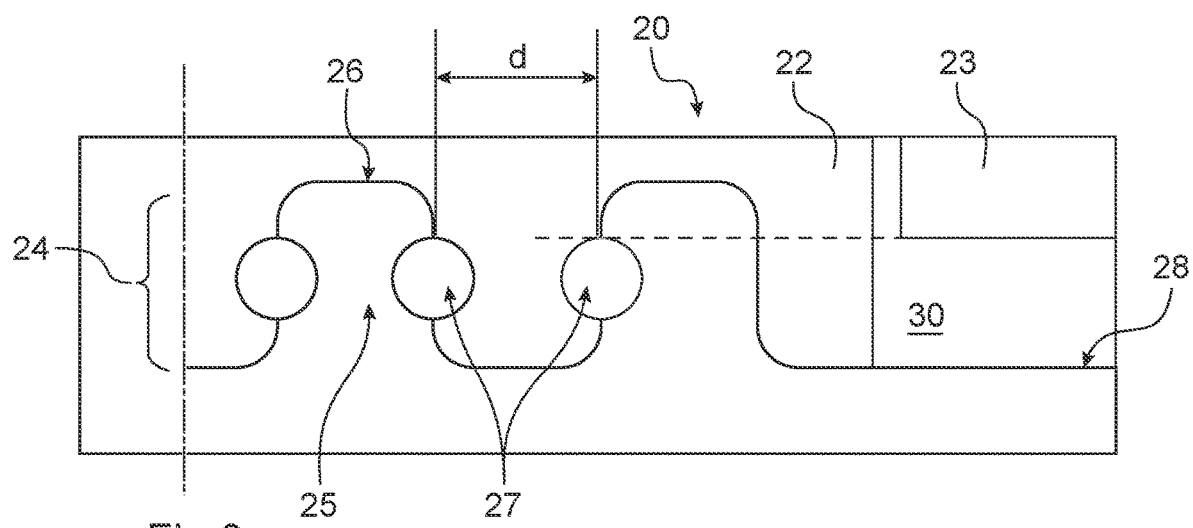
FIG. 3 shows an enlarged view of the attachment region of FIG. 2.

FIGS. 2 and 3 show an embodiment of the present invention.

The salient pole machine 30 of FIGS. 2 and 3 comprises a rotor 20, which rotates about a machine axis (not shown). Rotor 20 has at its circumference a rotor rim 28 with a predetermined outer radius 29. A plurality of salient poles 22, each extending in radial direction and being equipped with a pole winding 23, is attached to said rotor 20 at said rotor rim 21. Each pole is anchored to said rotor rim 21 at a pole-rim interface 24, which has the character of an interdigitation.

At each pole-rim interface 24 a plurality of axial rib-like rim extensions 25 project radially from the cylindrical surface 28 of rotor rim 21 with a predetermined circumferential distance d between neighboring rim extensions 25. On the other side, each salient pole 22 has a plurality of axial pole grooves 26 matching and receiving said rib-like rim extensions 25 of the pole-rim interface 24.

Salient pole 22 is fixed in this interdigitated configuration by means of fixing elements or fixation pins 27, which are provided to fix said rib-like rim extensions 25 in said pole grooves 26. Fixing elements 27 are arranged outside rotor rim 21. They extend and are applied in axial direction. They are arranged in respective interface holes between said pole grooves 26 and said rib-like rim extensions 25 at the sidewalls thereof, as shown in FIGS. 2 and 3.

According to this solution, as this rib-like rim extensions or ribs 25, extending from the rotor rim 21 and fitting into the pole 22 are accessible, one can remove the pins 27 and slide the pole 22 axially without removing the rotor 20 from inside the generator stator. Furthermore, as there are no ribs extending inwards into the rim 21, the rotor rim 21 is not weakened, thus using 100% of its radial strength.

Thus, pole fixation on the rotor rim 21 is done through axial pins. In order to have perfect contact among the adjacent surfaces or pole and rotor rim, different possibilities may be considered as variant to the base idea. One possible method of fixation is to ream the holes axially prior to introducing the fixation pins 27.

According to another solution, expansion pins may be used, which eliminate the radial clearance of the interface holes.

Depending on the pole design, the proposed new anchoring system might penetrate more or less inside the pole core of salient pole 22 and have a significant area under the area of pole winding 23. In this case one additional variant is to split the fixation pin 27 in two, preferably with crocodile tapered shape interface.

After sliding the salient pole 22 radially inwards over the rotor rim 21, the split pins shall be rotated and then axially driven to be locked one against each other.

Another variant within the present invention is that the pole fixation can be either normal to rim interface surface (cylindrical surface 28) or with trapezoidal shape, whereby the angle will facilitate the dismantling and removal of the pole 22.

The number of fixation pins 27 and their position in the pole-rim interface 24 is determined by mechanical dimensioning, i.e. the fixation pins 27 are not necessarily equally distributed along the interface surface of the poles to the rim. The same applies to the size of the pins, which does not need to be the same on each interface point.

The present invention has various advantages:

For machines, where the efficiency is not a key issue, the benefit can be optimized. Preliminary analysis indicates that a lighter machine may be realized with same or better performance.

Furthermore, critical speed can be increased.

Another plus of this solution is that less raw material is used for the poles since they do not need an extension called "pole claws".

Another advantage is to have large radius in the contact area, thus optimizing the stress concentration and, consequently, the fatigue lifetime of the pole.

An advantage of the use of shear pins is that they will help to transmit load in the rotor rim, together with the rim bolts; thus the rim can be even more optimized due to this new functionality.

Since in this solution there is no need to slide a pole claw through the rim, one additional advantage will be to reduce erection clearance between pole and rim, which is strongly beneficial to the magnetic circuit, because it reduces reluctance of the magnetic path.

The pole can be removed axially without removing the rotor from inside the machine or generator stator.

As there are no ribs extending inwards into the rim, the rotor rim is not weakened, thus using 100% of its radial strength.

It is within the scope of the invention to cool the machine through different ways, e.g. with radial ventilation cooling through the rotor rim, or with axial cooling (promoted with help of blades/fan pumping air axially through the machine rotor poles and stator).

LIST OF REFERENCE NUMERALS 10, 21 rotor rim
11 plate segment
12 cooling slit
13 strip (wedge carrier)
14 wedge
15 slot
16 pole claw
17 rotor pole
18 pole winding
19 pole gap 20 rotor (salient pole machine)
22 salient pole
23 pole winding
24 pole-rim interface
25 rim extension (rib-like)
26 pole groove
27 fixation pin (axial)
28 cylindrical surface
29 outer radius (rim)
30 salient pole machine

The invention claimed is:

1. A salient pole machine comprising:
a rotor rotatable about a machine axis, the rotor further comprising a rotor rim at a circumference thereof;
a plurality of salient poles, each salient pole comprising a pole winding and extending in a radial direction and attached to the rotor rim at a pole-rim interface;
the rotor rim comprising an outermost radial surface extending in the circumferential direction between the pole-rim interfaces;
each of the pole-rim interfaces comprising:
a plurality of axial rib-like rim extensions projecting radially from the outermost radial surface of the rotor rim with a predetermined circumferential distance (d) between neighboring rim extensions;
a plurality of axial pole grooves provided in the salient pole matching and receiving the rim extensions;
a plurality of axially extending fixing elements that fix the rim extensions in the pole grooves, the fixing elements inserted axially into facing interface holes defined in facing sidewalls of the pole grooves and the rib-like rim extensions; and
the fixing elements radially inward of the pole windings and accessible for axial sliding removal from the facing interface holes, wherein the salient poles with pole windings are subsequently removable from the rotor.

2. The salient pole machine according to claim 1, wherein the fixing elements are arranged radially outward of the outermost radial surface of the rotor rim.

3. The salient pole machine according to claim 1, wherein the fixing elements extend in the axial direction of the rotor.

4. The salient pole machine according to claim 3, wherein the fixing elements comprise axial fixation pins.

5. The salient pole machine according to claim 4, wherein the axial fixation pins comprise shear pins having a circular cross section.

6. The salient pole machine according to claim 4, wherein the axial fixation pins comprise expansion pins.

7. The salient pole machine according to claim 4, wherein the axial fixation pins comprise split pins.

8. A method for removing salient poles with winding configured thereon from a rotor that is rotatable within a stator of a salient pole machine, wherein the salient poles are attached to a rotor rim at a pole-rim interface, each of the pole-rim interfaces including:
a plurality of axial rib-like rim extensions projecting radially from the radial surface of the rotor rim;
a plurality of axial pole grooves provided in the salient pole matching and receiving the rim extensions;
a plurality of axially extending fixing elements that fix the rim extensions in the pole grooves, the fixing elements inserted axially into facing interface holes defined in facing sidewalls of the pole grooves and the rib-like rim extensions;
wherein the method comprises:
removing the fixing elements in an axial direction from the pole-rim interfaces; and
sliding the salient poles with attached windings in an axial direction relative to the rotor to remove the salient poles from the rotor without removing the rotor from the stator.

9. The method according to claim 8, comprising moving the salient poles in a radial direction away from the rotor rim prior to sliding the salient poles in the axial direction relative to the rotor.

10. The method according to claim 8, wherein the rotor rim has an outermost radial surface extending in the circumferential direction between the pole-rim interfaces.

11. The method according to claim 8, wherein the fixing elements are radially inward of the pole windings and thereby accessible for axial sliding removal from the facing interface holes for removal of the removal of the salient poles with pole windings from the rotor.

* * * * *